Dec. 4, 1928.
O. WINDBERGER
1,694,112
UNDERFRAME FOR AUTOMOBILE VEHICLES
Filed Nov. 21, 1927   5 Sheets-Sheet 2
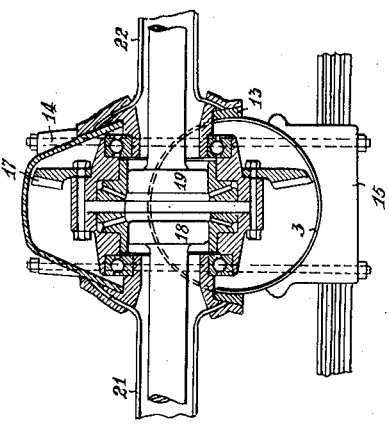
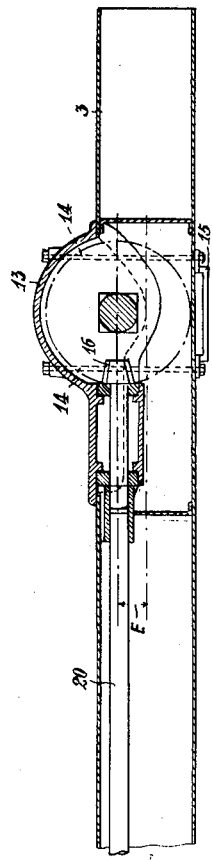
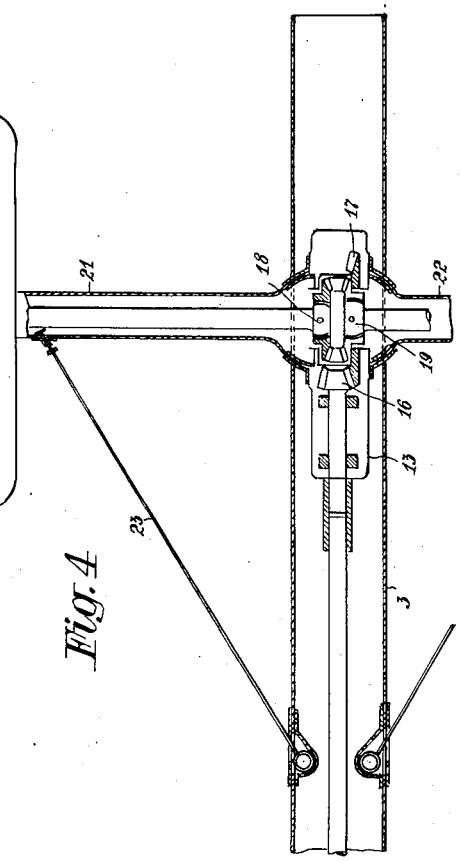

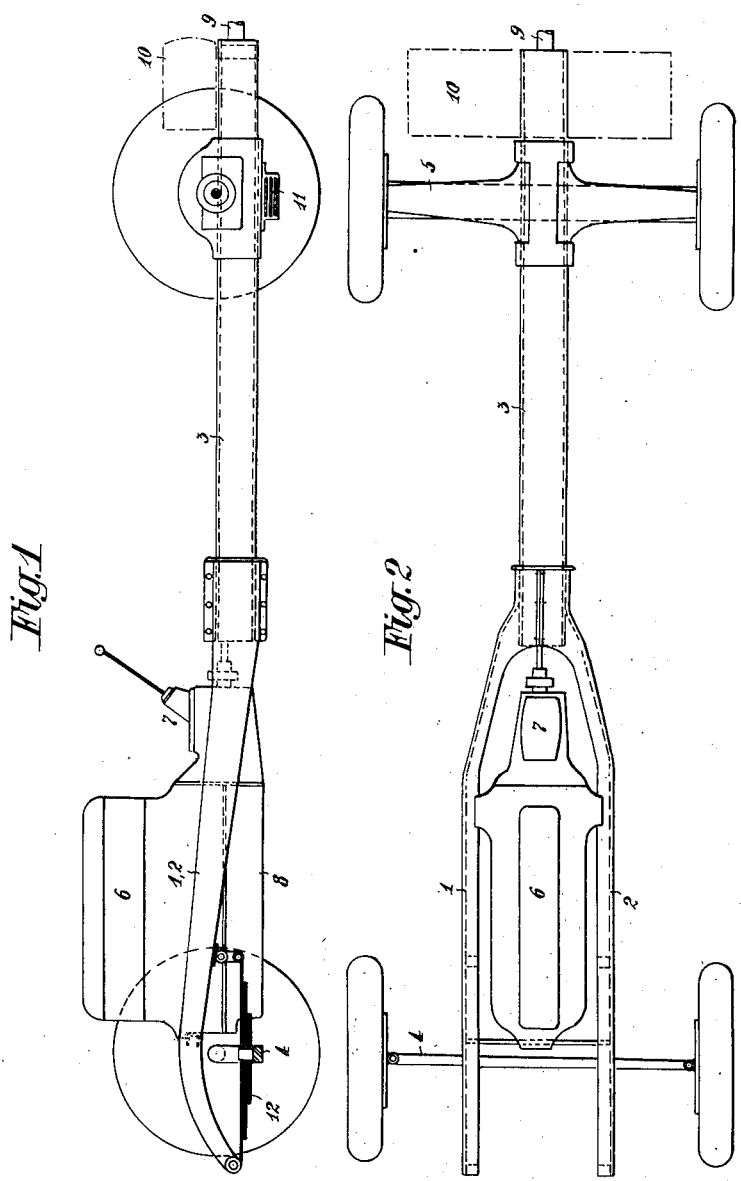

Dec. 4, 1928.  O. WINDBERGER  1,694,112
UNDERFRAME FOR AUTOMOBILE VEHICLES
Filed Nov. 21, 1927      5 Sheets-Sheet 3
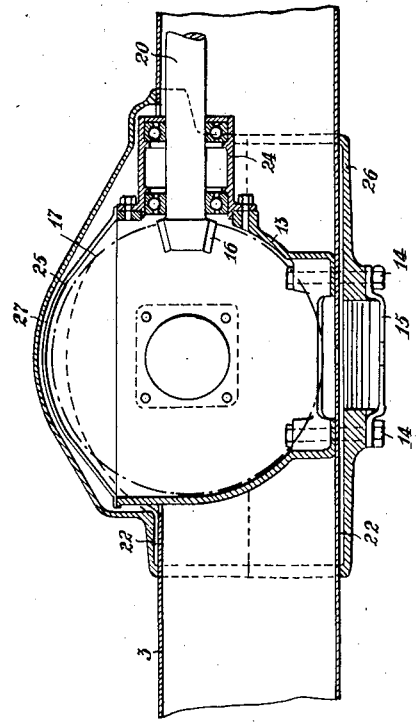

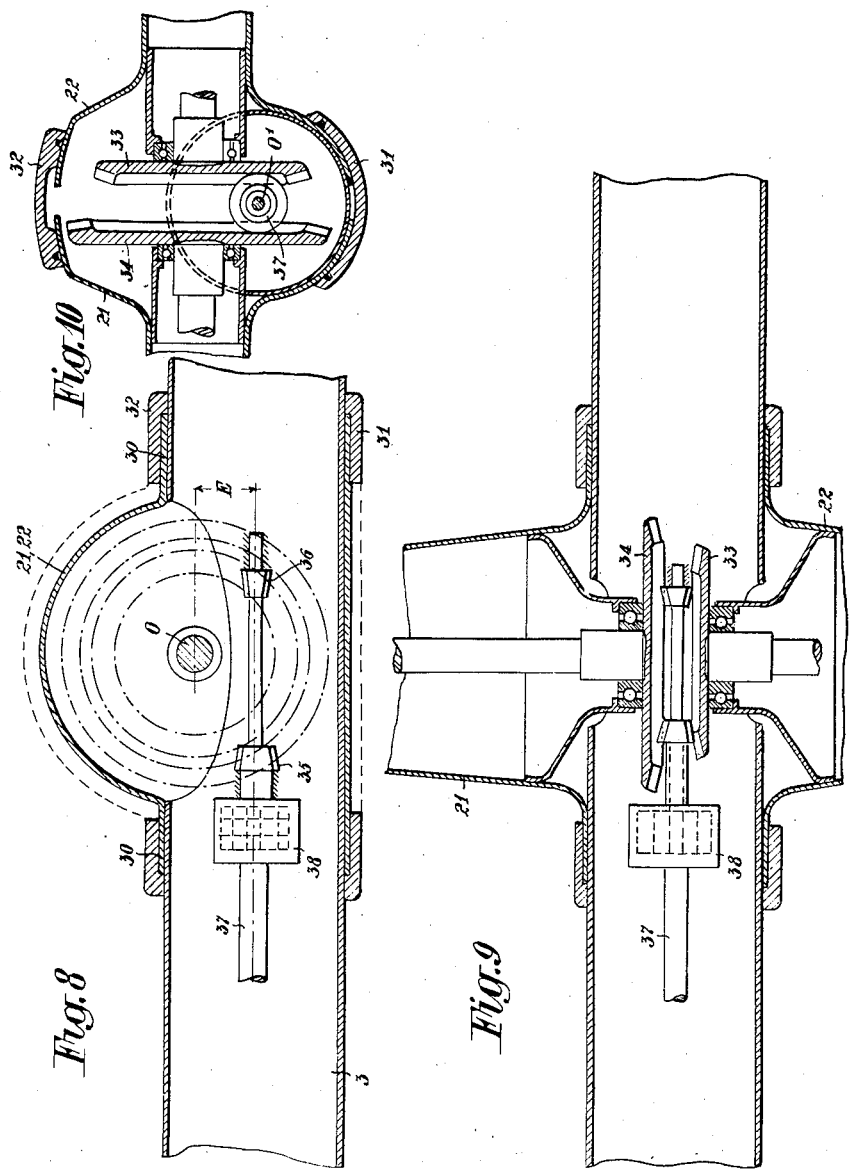

Dec. 4, 1928.  O. WINDBERGER  1,694,112
UNDERFRAME FOR AUTOMOBILE VEHICLES
Filed Nov. 21, 1927   5 Sheets-Sheet 5
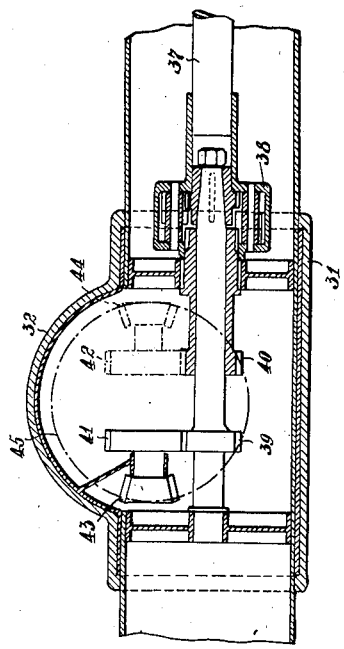
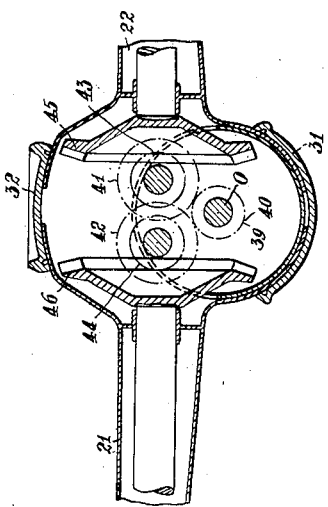

Patented Dec. 4, 1928.

1,694,112

UNITED STATES PATENT OFFICE.

OTHMAR WINDBERGER, OF WIENER-NEUSTADT, AUSTRIA.

UNDERFRAME FOR AUTOMOBILE VEHICLES.

Application filed November 21, 1927, Serial No. 234,881, and in Austria May 29, 1926.

The frames hitherto usual for automobile vehicles and the like consist of two longitudinal bearers which are connected or stiffened by transverse bearers, the wheel axles being connected with the longitudinal bearers by springs. In the case of these frame structures the disadvantage arises that an obstruction in the way of one of the wheels leads to a twisting of the frame, as a result of which the connection between the car body and the frame is exposed to heavy stresses. Hitherto these stresses have been taken into account by making both frame and car body of stout dimensions and very heavy, but this has the disadvantage that the vehicle carries a large dead axle load, which the motor has to overcome.

The present invention consists in a stiff frame which is adapted to resist twisting stresses and which consists of a tubular member extending in the longitudinal axis of the vehicle and of a fork-shaped member, the fork serving for the reception of the motor, transmission gearing and the like, and being supported by means of springs in the usual way upon one of the wheel axles. In the case of such a frame an obstruction in the path of a wheel has no twisting effect upon the frame, as a tube can easily be constructed so strong that it resists twisting by its stiffness, more particularly if the axis of torsion falls in the axis of the tube, while by the fork-shaped member of the frame a complete underframe is provided which is supported upon the wheel axles and into which the motor, the gearing and the like are fitted, and thus motor, gearing and the like are not used for the formation of the underframe but are capable of being built out. Such a frame in which the tubular member is arranged with its axis lower down than the wheel axles enables the car body bottom to be placed low down without the tube projecting into the interior of the car body. Such a frame with a tubular member in which the driving shaft is supported eccentrically in relation to the axis of the tube enables the frame, that is to say the tube, to be located lower down in relation to the wheel axles, while enabling the driving shaft to be arranged at the level of the wheel axles, thus maintaining the usual drive, notwithstanding the sunk arrangement of the frame. The sunk arrangement of the tube in conjunction with the eccentric supporting of the driving shafts enables the tube to be employed as a continuous beam and to be constructed as a bearer for the petrol tank, and for the fitting of luggage carriers or spare-wheel supports.

When employing swing axles the construction of the tube as a continuous girder has the advantage that the halves of the axles can be supported directly upon the tube, utilizing the rigid tube as a bearing. For driven axles such a tubular continuous bearer has the further advantage that the entire driving mechanism can be supported in a casing. Such a casing can easily be mounted and fixed in a saddle-like manner over a slot in the tube, or secured inside the tube. Furthermore, the continuous tube renders it possible to fit axle springs by means of a saddle-shaped bracket for example, in which case it is preferable to connect this bracket jointly with the casing containing the driven mechanism by fastening means, such as screws or the like, or to fix it on to the tube.

In the accompanying drawings, in Figures 1 and 2 is diagrammatically illustrated one constructional example of a frame according to the invention, with a driven rear swing axle, while in Figures 3 to 5 the driving arrangement of the rear axle is shown. In Figs. 8–10 and Figs. 11 and 12 two other examples of the invention with a driven rear swing axle are illustrated.

The frame consists of two members 1, 2 forming a fork, which are releasably connected with one another and with a tubular frame member 3, for example by the members 1 and 2 forming a sleeve for the tube 3, in which the tube is fixed, preferably immovably. The front wheel axle 4 is here connected with the ends of the fork by means of springs 12 but may also be constructed as an axle with a transverse spring or as a swing axle with a transverse spring. The rear axle 5 is constructed as a swing axle which is supported on a rear axle spring 11. The rear axle spring 11 is secured to the tube 3. The forked member 1, 2 of the frame, which serves for the reception of the motor 6 and the transmission gear 7, is of such a length in the constructional example of the drawing, that the gear 7 can be constructed separately, without the motor being in the way. The motor is fitted in between the two branches of the fork in such a way that the underpart 8 of the motor casing can be taken off downwards and the motor is readily accessible from below. The rear end of the tube 3 is constructed as a bearer for a fuel tank 10 and is provided with a support 9, which may serve for the reception of a luggage-carrier and a spare-wheel carrier.

The driving mechanism for the rear axle 5 which consists of two half axles 21 and 22 is lodged in a casing 13, which is mounted in a saddle-like manner over a slot in the frame tube 3, so that this slot is covered outwardly by this casing. The connection of the casing with the frame tube may be effected for example by screws 14, by which at the same time the spring bracket 15 is connected with the frame tube 3. The driving mechanism consists of a bevel wheel drive 16, 17, a differential, and Cardan joints 18 and 19, which are journalled in the casing 13. The driving shaft 20 is eccentrically supported in the frame tube 3, at the same height as the rear axle halves 21 and 22. The eccentric supporting of the driving shaft enables the tube 3 to be placed low down and thereby enables the car body bottom to be placed low down without the tube 3 projecting into the interior of the car body; for the casing 13 can be located underneath the seats, where it is not in the way. The half axle 21 and 22 may be supported either upon the tube 3 or on the casing 13.

For the stiffening of the wheel axle halves, stays 23 may be used, which are pivotally supported on the tube 3.

The casing 13 may however be arranged inside the tube 3. One example of such a constructional form is illustrated in Figures 6 and 7.

Here the casing 13 containing the driving members is secured within the tube 3 and at the same time connected with the spring bracket 15 by screws 14. The casing 13 is closed at the top with a cover 25 and at the sides with segments of spheres 28, as a result of which the lubricant remains inside the casing 13 and cannot reach the half axles 21 and 22 or their bearing points, so these bearing points may be constructed as dry bearings and frictional shock absorbers.

The half axles 21 and 22 are swingably supported on the tube 3 and enclosed by casings 26 and 27.

By lifting off the casing 27 the casing 13 is made accessible, and can be taken out of the tube 3 by loosening the screws 14 without other members having to be dismounted.

In the constructional example of Figures 8 to 10 of the drawing the two half axles 21 and 22 are oscillatably mounted upon such a frame tube 3, the axis $O_1$ of which lies the distance E below the axial centre O of the half axles 21 and 22. The frame tube forms the axis of oscillation of the half axles 21 and 22, which are rotatably mounted with bearing sleeves 30 upon the frame tube, and are held fast by means of a two-part casing 31, 32. The driving of the half shafts 21 and 22 is here effected through the medium of bevel wheels 33 and 34, which are mounted upon the half shafts and which co-operate with a pair of bevel wheels 35 and 36, which are mounted upon the driving shaft 37 and are driven through the medium of a differential 38. The driving shaft 37 is here arranged so low down that it passes through the centre of oscillation $O_1$ of the swing axles, and the bevel-wheel drive is accomplished by means of bevel wheels so that the half axles can oscillate while maintaining the engagement required for the drive. The frame tube 3 is suitably designed for the fitting in of the drive. All the members serving for the drive, including the bearings for the half axles, are fitted into the casing 31, 32, which is mounted upon the frame tube 3, and firmly, but preferably releasably, connected with the latter, so that the fitting in and the dismantling of the individual parts can be easily effected. As is obvious from the drawing, the low arrangement of the frame tube 3 also provides a means for lodging the drive within the frame tube, and thereby utilizing the latter as a continuous frame member, which can be carried so far rearwards that it can be utilized as a carrier for the petrol tank and the tool chest, and for spare wheels and the like. The car body can here be mounted directly upon the frame without the frame tube 3 projecting out of the bottom of the car body and thereby giving rise to the formation of projecting parts of the bottom within the car body.

The constructional example of Figures 11 and 12 is distinguished from the constructional example according to Figures 8 to 10 by the fact that the driving of the half shafts 21 and 22 is effected from the driving shaft 37 at a lower level through the medium of the differential 38 by means of two spur wheels 39 and 40, the differential also admitting of being arranged between these spur wheels. The spur wheels co-operate with spur wheels 41 and 42, each of which drives a bevel wheel, 43 and 44 respectively, which mesh with bevel wheels 45 and 46 mounted upon the half shaft. In the case of this constructional form the driving of the half shafts 21 and 22 is effected by a double transmission, namely a spur-wheel transmission 39, 41 and 40, 42 and a bevel-wheel transmission 43, 45 and 44, 46 respectively, the spur wheels 41 and 42 here rolling upon the wheels 39 and 40 during the oscillation. This drive is suitable for vehicles wherein high transmission ratios come into consideration, such for example as lorries, omnibuses, tractors and the like. By the double transmission a compact construction is made possible.

What I claim is:

1. In a motor vehicle, the combination with front and rear axles, of a member secured to said axles comprising a twist restraining tubular member secured adjacent one of its ends to a median point on one of said axles and extending at right angles thereto, a forked member forming longitudinal beams rigidly secured to the other end of said tubular member and secured to the other of said axles, said forked member forming means to support a motor mounting for said vehicle.

2. A motor vehicle as claimed in claim 1 in which the forked member has such a length that the motor mounting comprising a motor, a speed gear, and a clutch, can be mounted between its beams.

3. A motor vehicle as claimed in claim 1 and in combination therewith of means for mounting the motor mounting in the forked member in such a manner that the motor mounting and its parts can be downwardly dismounted.

4. A motor vehicle as claimed in claim 1 in which the inner end of the forked member is provided with a socket to which the tubular member is rigidly connected.

5. In a motor vehicle as claimed in claim 1 in which the tubular member is arranged to such an extent lower down than the wheel axles that said member comes to lie below the car body.

6. In a motor vehicle as claimed in claim 1 in which the tubular member is extended beyond the wheel axle to which it is secured whereby said tubular member can serve as a support for the fuel tank, luggage carrier, spare wheels or the like.

7. In a motor vehicle as claimed in claim 1 and in combination therewith, of means for swingingly mounting the vehicle axle on the tubular member whereby each half thereof is oscillatably supported on said tubular member.

8. In a motor vehicle as claimed in claim 1, and in combination therewith, of means for swingingly mounting the vehicle axle on the tubular member, and in which the axis of the tubular member is placed below the axes of the wheel axles and passes through the axis of oscillation of the swinging axle.

9. In a motor vehicle as claimed in claim 1 in which the vehicle axle mounted on the tubular member is a driven swinging axle, the axis of oscillation of said swinging axle and the axis of the wheel centers being located at different levels, and a driving mechanism comprising a transmission gearing connecting the driving shaft to the wheel axles, permitting oscillatory movement of the wheel axles.

10. In a motor vehicle as claimed in claim 1 in which the driving mechanism is arranged in a casing which is mounted as a saddle above a slot in the tubular member.

11. A motor vehicle as claimed in claim 1 in which the driving mechanism is arranged in a casing, means for securing said casing to the tubular member, springs to resist movement of the said axle, a bracket to support said spring on said tubular member, said means for securing said casing to the tubular member serving as means for securing said spring bracket thereto.

12. In a motor vehicle as claimed in claim 1 in which the tubular member is located below the wheel axles to which it is secured, and a driving shaft mounted in said tubular member eccentric thereto.

In witness whereof I have hereunto signed my name.

OTHMAR WINDBERGER.